Dec. 4, 1945. G. BARTH 2,390,051
MEANS FOR MEASURING MAGNETIC FIELDS
Filed July 15, 1941
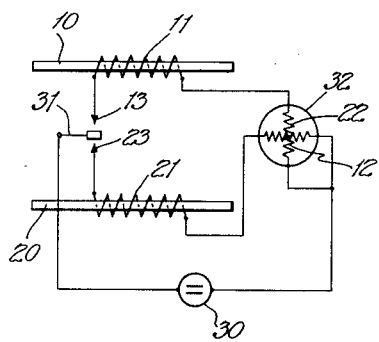
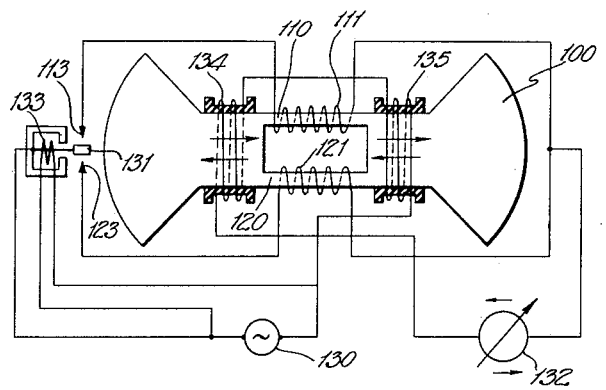
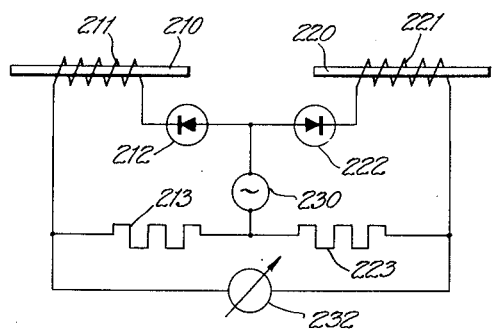
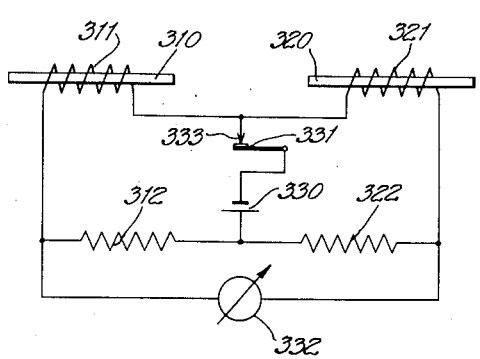
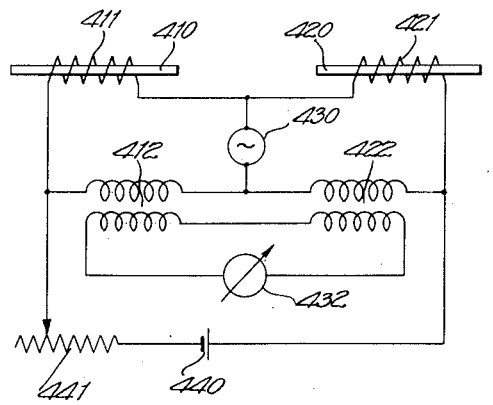
GUSTAV BARTH.
INVENTOR.
BY Knight Brothers
ATTORNEYS.

Patented Dec. 4, 1945

2,390,051

UNITED STATES PATENT OFFICE 2,390,051

MEANS FOR MEASURING MAGNETIC FIELDS

Gustav Barth, Berlin, Germany; vested in the Alien Property Custodian

Application July 15, 1941, Serial No. 402,530

2 Claims. (Cl. 175—183)

The invention relates to means for determining the magnitudes of a magnetic field, in particular the field strength and the direction of the lines of force of the field, and is a continuation-in-part of my copending application, Serial No. 181,719, filed December 24, 1937, now Patent No. 2,252,059, issued August 12, 1941.

According to the method and means described in my above-named patent, a body of high magnetic permeability to be exposed to the field to be investigated, is provided with an inductance winding and with current supply means for energizing the winding with a periodically variable current. The field to be measured causes in the body a substantially constant magnetic flux. The electric energization produces another magnetic flux of periodically variable character. The reciprocal or differential effect of these two fluxes is used as a measure of the field magnitudes to be determined. To this end, a measuring or indicating instrument is connected with the circuit of the aforementioned current supply means, or with a separate circuit magnetically associated with the highly permeable body, for instance, by means of a second winding provided on the body. As also described in my above-mentioned patent, the sensitivity of such a measuring system is enhanced by superposing a unidirectional magnetization on the two magnetizations aforementioned. For instance, a rectified current derived from the current to be measured by the instrument is used for producing a superposed magnetization which varies its intensity in accordance with that of the instrument current. This magnetic feedback arrangement amplifies the effect to be determined.

An object of the present invention is to improve on the magnetic field measuring systems of the above-characterized type. Another more particular object of the present invention is to further increase the sensitivity and accuracy of such measuring systems.

To this end, and in accordance with the present invention, a magnetic field measuring system constructed in general as stated above is provided with two magnetizable cores or bodies and with two windings disposed on the magnetizable cores respectively, an energizing circuit being so connected with these windings as to produce in the two cores a periodically variable flux which in one body has a direction opposite to that of the variable flux in the other body. A common measuring or indicating instrument is connected with both windings so as to respond to the differential effect caused by the resultant magnetization of the two bodies respectively.

The present invention will be fully understood from the following description of the embodiments diagrammatically exemplified in the drawing in which Fig. 1 shows a measuring system containing two separate magnetizable bodies, and Fig. 2 another measuring system employing a single magnetizable body with two core sections and an amplifying magnetic feedback arrangement, while Figs. 3 to 5 show further modifications all being different from one another.

The embodiment shown in Fig. 1 is identical with the one disclosed in Fig. 14 and the corresponding description of my above-mentioned Patent No. 2,252,059, but is not specifically defined in the claims of the patent, the purpose of my present case being to secure also specific protection of the invention represented by Fig. 13 of the patent and to also protect other specific measuring systems of related nature.

The measuring system illustrated in Fig. 1 contains two elongated bodies 10 and 20 of highly permeable magnetic material, for instance Permalloy. The bodies are preferably of great length as compared with their width. They are arranged in spacial parallel relation and become magnetized when exposed to a magnetic field to be investigated, for instance the magnetic earth field, the magnetization being strongest when the bodies lie in the direction of the lines of force. Each body is provided with windings 11 and 21 respectively. The system further contains a direct current source 30, a periodically operating contact interrupter 31, and an indicating instrument 32. The interrupter 31 has two outer contacts 13 and 23 connected with the windings 11 and 21 respectively, and an intermediate contact connected with the current source 30, which in turn is connected through the instrument 32 with the other ends of the windings 11 and 21 respectively. Hence, when in operation, the windings 11 and 21 are energized by a current whose intensity is periodically varied by the interrupter 31. As a result, a periodically varying magnetic flux is superposed in each body 10 and 20 on the unidirectional flux caused by the magnetic field under investigation, the variable fluxes having the same frequency.

The indicating instrument 32 has two windings 12 and 22 of opposite winding direction which are traversed by the currents of the windings 11 and 21 in such a manner that, for instance, in the case of an equal intensity of the currents, their effects on the indicating system of the instrument are neutralized. For instance, a differential galvanometer, a rotary magnet or the like may be employed as an indicating instrument.

If the arrangement is brought into a magnetic field, for instance of constant field strength, the magnetic constant flux produced by the field in the bodies 10 and 20 affects the reactance of each winding 11 or 21, and the intensity of the current flowing through the winding is changed correspondingly. The superposed magnetization caused in each body by the periodically variable current from source 30, as compared with the constant flux, is additive in one of the bodies and subtractive with respect to the other body, due to the fact that the variable magnetic fluxes caused by the oppositely coiled windings are of opposite direction in the two bodies 10 and 20 respectively. Consequently, the inductive resistances of the two windings 11 and 21 are different from each other, and the currents flowing through the windings 11 and 21 have different intensities. The differential current intensity derived from the currents in both windings is indicated by the instrument 30. As a result, the system is very sensitive as to the strength and direction of the field to be measured.

Such a system may also be provided with the aforementioned means for superposing a third magnetization component on the bodies 10 and 20, for instance a direct current magnetization, in order to select the working range of the magnetization curve of the bodies or for effecting an amplifying magnetic feedback. A modified system providing for an additional magnetization of this type is exemplified by Fig. 2.

According to Fig. 2, a magnetizable and highly permeable body 100 has two narrowed core sections 110 and 120 of elongated shape arranged in parallel to each other. Each section 110 and 120 carries a winding 111 or 121 having one terminal connected with an indicating instrument 132 and the other with a contact 113 or 123 of a vibratory interrupter. The magnetizable body 100 is provided with two additional windings 134 and 135 which are series-connected with each other, an alternating current source 130 and with the instrument 132. The other pole of the current source 130 is connected with the intermediate contact 131 of the vibratory interrupter. The actuating coil 133 of the interrupter is separately connected with the same current source 130 so that the interrupter operates in synchronism with the current source and passes opposite half-cycles of the current alternately through the two windings 111 and 121. As a result, the two core sections 110 and 120 are alternately magnetized in opposite directions. The instrument 132 responds to the currents of both windings and indicates their differential value.

The function of this system is similar to that of the first-described embodiment. However, since the windings 134 and 135 superpose an additional magnetization in accordance with the instrument current, the effect of the field to be determined is amplified and the sensitiveness of the system further enhanced.

The measuring system illustrated in Fig. 3 contains two magnetic bodies 210 and 220 of highly permeable material. These bodies may again consist of two separate magnet cores or they may form sections of one and the same magnetic structure. Each of the two bodies is provided with a winding 211 and 221 respectively. One end of each winding is connected through an electric valve means 212 and 222 respectively, for instance dry rectifiers, with one pole of an alternating current source 230 whose other pole is connected through resistors 213 and 223 respectively with the other ends of the windings 211 and 221. An indicating instrument 232 is connected across both resistors 213 and 223. Due to the action of the valves 212 and 222, opposite half-waves of the alternating current from source 230 are passed through the two windings 211 and 221. The windings are so connected that these alternating half-waves produce in the bodies 210 and 220 magnetizations of opposite directions. Consequently, an additive magnetization caused by one of the windings is superposed in one body to the magnetization caused by the magnetic field to be investigated, while the magnetization caused by the winding in the other body is subtractive with respect to the magnetization effected by the field. The inductive resistance of each winding 211 or 221 is varied in accordance with the resultant magnetization in the appertaining magnet body. The instrument 232 responds to the currents in both windings 211 and 221 and indicates their differential effect. The instrument 232 and the frequency of the alternating current source 230 are preferably adapted to each other so as to produce a steady indication.

In the measuring system according to Fig. 4, two magnetizable bodies or sections 310 and 320 are provided with windings 311 and 321 connected through resistors 312 and 322 respectively with a direct current source 330, and a periodically operating switch, for instance of the vibratory type, is interposed between the windings and the direct current source. The two contacts of the interrupter are designated by 331 and 333. An indicating instrument 332 is connected with the two resistors 312 and 322 so as to respond to the currents in both resistors in a manner similar to the operation of the indicating instrument in the system of Fig. 3. It will be seen from Fig. 4 that during the current-transmitting intervals of the interrupter an energizing direct current flows through the two windings 311 and 321 in opposite directions. Consequently, the superposed magnetizations effected by these windings have opposite directions in the two bodies. The instrument 332 indicates the differential effect of the resultant magnetizations.

As described in the foregoing, it is possible to provide systems according to the present invention with means for superposing in the magnetizable bodies a unidirectional magnetization permitting a selection of a preferable range of the magnetic characteristic. An embodiment of this type is exemplified by the system shown in Fig. 5. According to this figure, the two magnetizable bodies 410 and 420 of high permeability have each a winding 411 or 421 connected with an alternating current source 430 and with the primary winding of a transformer 412 or 422. The secondary windings of the two transformers are connected in series with each other and with an indicating instrument 432. The point intermediate winding 411 and transformer 412, and the midpoint between winding 421 and transformer 422, are connected with each other through an adjustable resistor 441 and a direct current source 440. The network of this system is so designed that the alternating current in either winding has at any time the opposite direction from the current in the other winding. Consequently, the instrument 432 operates in a manner similar to that described with reference to the previous examples. The direct current source superposes a constant unidirectional energization in the two windings and consequently, a unidirectional auxiliary magnetization in the two bodies. The intensity of this auxiliary magnetization can be varied by means of resistor 441. Instead of connecting the direct current source with the alternating current windings 411 and 421, it is also possible to provide the magnetizable bodies with additional windings carrying the direct current. It will also be apparent from the various examples above described that a great number of different systems according to the invention can be designed, the common essential characteristic being that two magnetizable bodies are provided to be exposed to the magnetic field to be measured, and that in these two bodies a variable magnetization is superposed having opposite directions in the two bodies, the differential effect caused in an electric measuring circuit by the resultant magnetizations of the two bodies respectively, being used as a measure of the determinant of the field to be investigated.

I claim:

1. A system for measuring a substantially unidirectional magnetic field, comprising two magnetizable core sections of elongated shape to be exposed to said field, said sections being arranged in similar directions relative to each other, circuit means magnetically associated with both said sections for alternately magnetizing said sections in opposite directions, and current-responsive indicating means connected with said circuit means for indicating the differential effect of the resultant magnetizations of said sections on the current in said circuit means.

2. A system for measuring a substantially unidirectional magnetic field, comprising two magnetizable core sections of elongated shape to be exposed to said field, said sections being arranged in similar directions relative to each other, a magnetizing winding disposed on each of said sections, an alternating current source connected with said windings, rectifying means disposed between said current source and said windings to supply said winding alternately with unidirectional currents of opposite directions in order to magnetize said sections in opposite directions, and current-responsive indicating means connected with said windings for indicating the differential effect of the resultant magnetizations on said currents.

GUSTAV BARTH.